(12) United States Patent
Hosoe et al.

(10) Patent No.: US 7,367,102 B2
(45) Date of Patent: May 6, 2008

(54) METHOD FOR MOUNTING OBJECT AND SPINDLE DEVICE

(75) Inventors: Shigeru Hosoe, Hachioji (JP); Hiroyuki Matsuda, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/295,543

(22) Filed: Dec. 7, 2005

(65) Prior Publication Data
US 2006/0127195 A1 Jun. 15, 2006

(30) Foreign Application Priority Data
Dec. 13, 2004 (JP) .................. JP2004-360403

(51) Int. Cl.
*B23P 19/04* (2006.01)
*B23P 19/10* (2006.01)

(52) U.S. Cl. ............... 29/525.01; 29/525.11; 269/21; 269/8; 279/3; 279/128; 409/131; 409/232; 82/1.11

(58) Field of Classification Search .......... 29/428, 29/525.01, 743, 525.11; 269/21, 8, 6, 3, 269/43, 71, 291, 259; 279/3, 128; 451/289, 451/388, 494; 409/131, 232; 82/1.11
See application file for complete search history.

(56) References Cited

U.S. PATENT DOCUMENTS 5,658,192 A * 8/1997 Reinauer .................. 409/232
6,672,576 B1 * 1/2004 Walker ..................... 269/21
2001/0041650 A1 * 11/2001 Senga et al. ............... 483/1
2006/0186750 A1 * 8/2006 Hosoe ...................... 310/114

FOREIGN PATENT DOCUMENTS

JP 2002-224924 A * 8/2002

* cited by examiner

*Primary Examiner*—Erica Cadugan
(74) *Attorney, Agent, or Firm*—Finnegan, Henderson, Farabow, Garrett & Dunner, L.L.P.

(57) ABSTRACT

A spindle device to mount and rotate an object, including: a housing; a main shaft supported by the housing rotatably to the housing wherein the main shaft includes a through hole which goes through from an end to the other end thereof, and an opening of the through hole forms a mounting section to mount the object at the end, and an opening of the through hole forms a suction section at the other end; a connecter member disposed to cover-the outside of the other end and connected with the external negative-pressure source; and a bearing disposed between the circumference of the main shaft at other end and the connecter member covering the outside; wherein the object is suctioned onto the mounting section at the end with the external negative-pressure source through the through hole.

12 Claims, 6 Drawing Sheets

<PRIOR ART>

FIG. 8

METHOD FOR MOUNTING OBJECT AND SPINDLE DEVICE

This application claims priority from Japanese Patent Application No. 2004-360403 filed on Dec. 13, 2004, which is incorporated hereinto by reference.

BACKGROUND OF THE INVENTION

This invention relates to a method for mounting an object and a spindle device, and more particularly relates to a method of mounting an object that is more suitably used in a machine tool capable of performing high-precision processing, and to a spindle device.

In the spindle device utilized on a machine tool, a prescribed process is performed by mounting an object such as a tool or a work piece to a main shaft of the spindle device and by rotating it. It is to be noted that negative pressure is sometimes utilized when mounting the object to the main shaft (See Patent Document 1). In this case, positioning of the main shaft and the object is important in order to perform high-precision processing, but mounting in which negative pressure is utilized has merit in that adjusting the position of the main shaft and the object is comparatively easy even after the mounting.

[Patent Document 1] Japanese Patent Application Laid-Open 2002-224924 Publication There have been attempts to rotate the main shaft at higher speeds in order to increase processing efficiency. It has become clear that in this case, when the object is mounted to the main shaft using negative pressure, it is possible that the object may shift during the processing due to the centrifugal force. In order to solve this problem, the object may be fixed to the main shaft using bolts, but when the object is fixed with bolts, it is difficult to adjust the position of the main shaft and the object after the fixing.

Further, in the case where the object is mounted to the main shaft using negative pressure, there is a problem of how to generate negative pressure for the rotatable main shaft. In Patent Document 1, the suction holes which are formed on the main shaft and are communicated with the suction holes in the housing are suctioned from outside thought a chuck. Thus, in the configuration of Patent Document 1, in the case where the main shaft decenters with respect to the housing and deforms due to thermal expansion, there is concern that the inner peripheral surface of the housing may contact the outer peripheral surface of the main shaft.

SUMMARY OF THE INVENTION

This invention was conceived in view of problems of the prior art, and the object thereof is to provide a method for mounting an object in which the object and the main shaft can be positioned with high precision and fixing is ensured, as well as to provide a spindle device. Another object of this invention is to provide a suitable spindle device to suction the fluid in the main shaft.

The above object will be achieved by each of the structures below.

A spindle device to mount and rotate an object, comprising: a housing; a main shaft supported by the housing rotatably to the housing wherein the main shaft includes a through hole which goes through from an end to the other end thereof, and an opening of the through hole forms a mounting section to mount the object at the end, and an opening of the through hole forms a suction section at the other end; a connecter member disposed to cover the outside of the other end and connected with the external negative-pressure source; a bearing disposed between the circumference of the main shaft at other end and the connecter member covering the outside; wherein the object is suctioned onto the mounting section at the end with the external negative-pressure source through the through hole.

DETAILED DESCRIPTION OF THE PREFERRED EMBODIMENT

Preferred structures and methods to achieve the above object will be explained as follows:

In the method in which the object is mounted on the main shaft of the spindle device, the method for mounting the object of Item 1 has a first step of adhering the object to the main shaft, a second step of positioning the object with respect to the main shaft while maintaining step 1 and a third step of mechanically fixing the object to the main shaft while maintaining step 1.

After the object is adhered to the main shaft using negative pressure and, for example, if the object is lightly tapped, the relative position with respect to the main shaft can be changed. Thus in this structure, by positioning the object with respect to the main shaft while adhering the object to the main shaft, high-precision position adjustment can be realized. Further, by mechanically fixing the object to the main shaft after position adjustment, even in the case where the main shaft is rotated at a high speed, position shifting of the object can be controlled and thus high precision processing can be performed. After the object is mechanically fixed, adhering may be terminated or may be continued. It is to be noted that examples of the "object" includes tools, work pieces, and holders for holding these tools and work pieces.

In the method of Item 1, the method for mounting the object of Item 2 has the first step of adhering the object to the main shaft, in which the object is adhered to the main shaft using negative pressure, thus even after the object is adhered to the main shaft, if the object is lightly tapped, the position relative to the main shaft can be more easily changed. It is to be noted, that static electricity or magnets can be used for adhering.

In the method of Item 1 or 2, the method for mounting the object of Item 3 has the third step of mechanically fixing the object to the main shaft, in which the object is fixed to the main shaft using bolts, thus by mechanical fixing, even in the case where the main shaft is rotated at a high speed, control of position shifting of the object can be ensured even more.

In the spindle device having housing and a main shaft that is supported so as to rotate with respect to the housing, the spindle device of Item 4 includes an adhering device for adhering the object to the main shaft and a fixing device for mechanically fixing the object to the main shaft.

After the object is adhered to the main shaft using negative pressure, for example, if the object is lightly tapped, its relative position with respect to the main shaft can be changed. Thus in this structure, by positioning the object with respect to the main shaft while adhering the object to the main shaft using the adhesion device, high-precision position adjustment can be realized. Further, by mechanically fixing the object to the shaft after position adjustment using the fixing device, even in the case where the main shaft is rotated at a high speed, position shifting of the object can be controlled and thus high precision processing can be performed.

In the structure of Item 4, the spindle device of Item 5 has a property that the adhesion devise has a suction path that is formed on the main shaft and a negative pressure source that is connected to the suction path, thus after the object is adhered to the main shaft, if the object is lightly tapped or the like, its position relative to the main shaft can be easily changed. However, a static electricity chuck or a magnetic chuck and the like can be used for adhering.

In the structure of Item 4 or 5, the spindle device of Item 6 has a property that the fixing device has a bolt-hole formed on the main shaft and a bolt which screws into the bolt-hole, thus by fixing with the bolt, even when the main shaft is rotated at a high speed, control of position shifting of the object can be more reliable.

The above object will be achieved by each of the structures below. The spindle device of Item 7 including: a housing; a main shaft that is supported so as to rotate with respect to the housing and has a fluid passage inside and one end of the passage opens in the axial direction; a connector member which covers the one end of the main shaft, is disposed to rotate relative to the main shaft, and whose inside is communicated with an external negative pressure source; and a hydrostatic bearing that is disposed in the radial direction between the main shaft and the connector member.

Generally the negative pressure pump which is the negative pressure source is stationary and thus when an attempt is made to suction the fluid from the passage inside the rotating main shaft, some kind of device is necessary for connecting the negative pressure source that is stationary and the rotating main shaft in order to make fluid transmission possible. Thus in the prior art, suction hole is formed in the main shaft, and a fixing and suction opening is formed with the space from the suction hole being as small as possible, and an O-ring is placed between the space and sealed and then suctioning and the like is performed. However in the former method, because the pressure is reduced, foreign matter floating in the environs is also sucked in with surrounding air and this puts load on the suction pump and reduces its lifespan. There are additional problems in that it is difficult to make and keep the spaces uniformly small as possible in order to increase suction efficiency, and adjustment is time consuming. In addition, in the case where the adjustment is not suitable, a problem arises in that the parts having the fixed suction hole contacts and galls the main shaft. On the other hand, in the latter device, problems arise in that the friction due to the O-ring reduces the rotation accuracy of the main shaft and causes heat generation, and the drive torque which is necessary for the drive means is increased due to the drag of the O-ring and this increases energy consumption.

Figure 7:
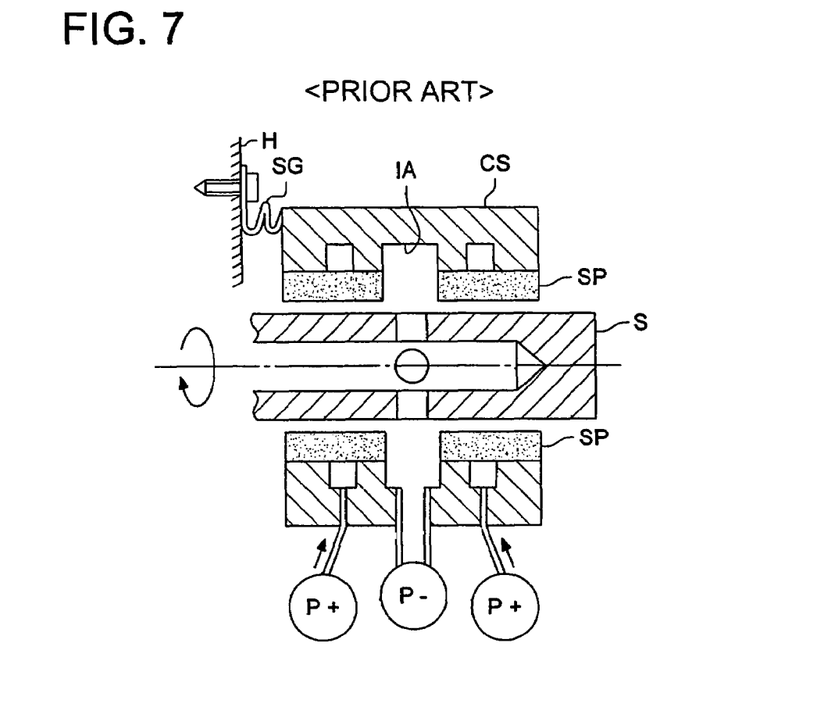
FIG. 7 is a cross-sectional view showing the conventional structure.

For the countermeasure of this problem, as FIG. 7 shows, there is developed a technology to keep the gap between rotating shaft S and hydrostatic pad SP at about 10 μm by jetting the fluid from the hydrostatic pressure pad SP, and to fix the shaft maintaining the non-contact state by disposing a hydrostatic pad SP on the case CS including fixed suction hole IA which opposes the opening toward radial direction of rotating shaft S having a suction path inside. The case CS is supported on the housing H so as to be moveable in relation to each other via the spring SG. Fluid such as pressurized air is jetted from the hydrostatic pressure pad SP, but because the space is narrow, the jetting pressure is low, and if the capacity of the negative pressure pump P is large, jetting air will not be a load, for the most part, and the pressure inside the rotating shaft S can be reduced. In addition, because the space is automatically kept evenly by the hydrostatic force, adjustment of decentering is not needed. However, in this technology, because a fixed suction opening IA is in the region that is between two hydrostatic pressure pads SP, when supply of the fluid is stopped, foreign matter or solvent sucked in due to the pressure reduction in the rotation shaft S, sometimes enter into the gap between the surfaces of hydrostatic bearing and the shaft and if the rotation shaft S rotates in this state, there is concern that galling may occur.

More specifically, considering the problems of the technology shown in FIG. 7 reveals that, because the suction path in the rotation shaft S does not pass through, but bends and runs from the suction opening to the exterior, the foreign matter, processing oil, solvent and the like that is suctioned tends to collect at the bottom of the non-penetrating hole. In addition, because the suction path is bent, the speed of foreign matter or processing oils which had increased by suction, is reduced and then discharged to the exterior of the rotating shaft, and then moves around the static pressure pad SP which is in the vicinity of the exit, and these parts tend to become contaminated. This tendency becomes even more outstanding when the static pressure pad SP is formed of a porous material. That is to say, when the supply of fluid to the static pressure pad SP that is formed from the porous material is stopped, there is concern that the foreign matter, processing oil, and solvent that contaminate this area will easily enter the spaces on the static pressure surface. In particular, the fluids such as the solvent and the processing oil have properties which allow them to easily enter the spaces due to the capillary phenomenon, and thus the problem is even more severe. Furthermore; the case CS is fixed to housing H so as to be displaceable using the spring SG, and thus when the main shaft S rotates at a high speed and the frictional force due to viscous resistance of the fluids of the static pad SP and the main shaft S becomes large, and friction occurs at this portion due to mixing of the foreign matter, the case CS can be easily rotate with the main shaft S and damage occurs due to entanglement of the spring SG, and the positive pressure and negative pressure tubes.

In this structure, because the fluid path in the main shaft opens in the axial direction, the foreign matter and processing oil sucked up are accelerated in this path without interruption and expelled from the main shaft to the exterior immediately, and impact the-wall surface of the connector member which are different position from the hydrostatic bearing and then drops, and thus the possibility of contamination of the hydrostatic bearing is reduced. For this reason, even if the fluid is stopped, there is no concern that the foreign matter, processing oil and solvent from the main shaft will enter the static pressure gaps of the hydrostatic bearing, and thus galling and the like does not occur, and the reliability of the function is high. In addition, because fixing of the case CS is ensured, even if the friction with the main shaft increased, there is no possibility of entangling with the case CS and causing a dangerous situation or damage.

Figure 8:
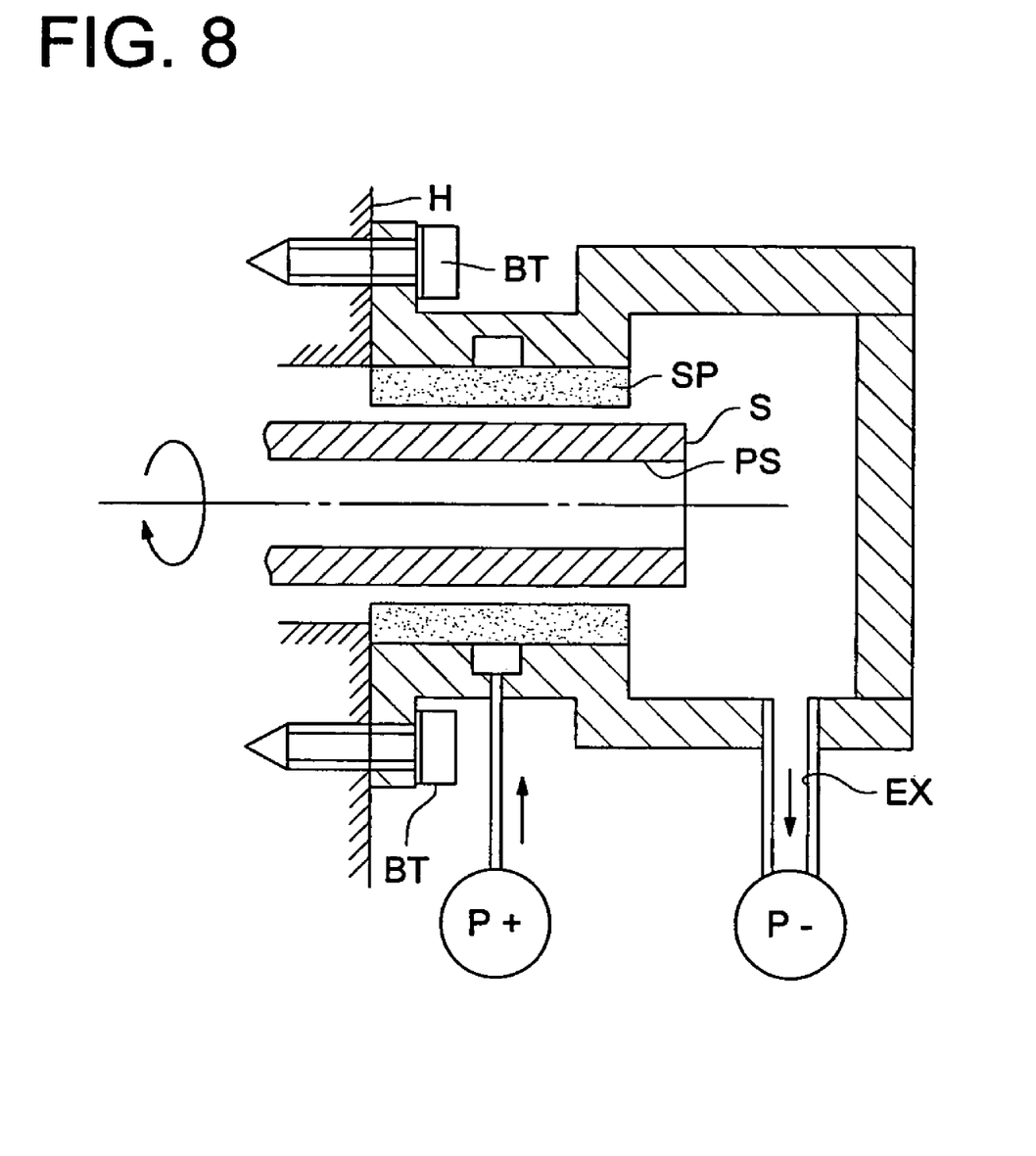
FIG. 8 is a cross-sectional view showing the example of the present invention.

More specifically, in FIG. 8 which shows an example of the spindle device of this structure, the main shaft S has a fluid passage PS that extends to the inside in the axial direction and the end of the passage PS opens in the axial direction from one end surface of the main shaft S. The case-like connector member CM which is mounted by the bolt BT to the housing H receives the open end of the main shaft S. At the end of main shaft S, in radial direction externally, a statistic pressure pad SP, for example in porous form, is installed on the inner wall of the connector member CM. With a positive pressure pump P+, by supplying high pressure fluid from the back surface side of the static pressure pad SP through the pores, contact of the outer peripheral surface of the main shaft S and the static pressure pad SP is avoided. In addition, if the fluid in the passage PS of the main shaft S is suctioned via the inside of the connector member CS from the fixed suction opening of the connector member CS connected to the negative pressure pump P−, for example a tool can be mounted on the other end surface side of the passage PS with negative pressure. It is to be noted that when the inner peripheral surface provided at the discharge exit EX of the fluid in the connector member CM is larger than the inner peripheral surface provided at the static pressure pad SP in diameter (the surface has a step), the fluids such as the processing solution that collected in the vicinity of the discharge exit EX do not contact the hydrostatic pressure pad SP, and thus contamination thereof is controlled.

This structure provides a spindle device which can be simply assembled and in which there are no problems such as galling caused by foreign matter. It is to be noted that the features of this structure are as follows. (1) If the path for the fluid in the main shaft is a through hole that runs to the end thereof, the path can be formed by a single process using a drill and thus processing is simple. (2) If the connector member is supported on the housing so as to be displaceable, the space between the connector member and the main shaft is automatically adjusted evenly so as to align center by the static pressure of the hydrostatic bearing, and thus a state of no contact with the main shaft is maintained, and there is no frictional load, assembly is easy and space adjustment becomes unnecessary. (3) In the case where the connector member is fixed with a bolt, even if the main shaft is rotated at a high speed, entangling of the connector members due to viscous resistance of the fluid is controlled. (4) Even if the supply of the fluid is stopped, it is difficult for foreign material or solvent that was suctioned to enter the hydrostatic surface of hydrostatic bearing and thus galling is unlikely to occur. (5) By using only one hydrostatic bearing, the structure is simplified and the cost is lowered. A porous graphite material is preferably used as the hydrostatic pressure pad of the hydrostatic bearing because cost is low and processing is easy, and by some chance even if it contacts the main shaft, galling is unlikely to occur.

In the spindle device of Item 8 according to the structure of Item 7, the fluid in the channel of the main shaft is suctioned to the outside via the connector member.

In the spindle device of Item 3 according to the structure of Item 7 or 8, the object is mounted using negative pressure at the other end of the fluid channel in the main shaft.

In the spindle device of Item 10 according to the structures of Items 7-9, the paths penetrate from the one end of the main shaft to the other end in the axial direction.

In the spindle device of Item 7 to 10, the spindle device 11 has the hydrostatic bearing which includes a static pressure pad formed of a porous material.

It is to be noted that if the fluid used in this structure is a medium that generates static pressure, it can be used irrespective of whether it is a liquid or a gas, however considering easiness of handling, a gas is preferable. Further, the air is more preferable since it can be used at low cost.

According to the structures and methods of the present invention, a method for mounting an object and a spindle device in which the object and the main shaft can be positioned with high precision and reliably fixed can be provided. Further, a spindle device suitable for suctioning the fluid inside the main shaft can be provided.

Figure 1:
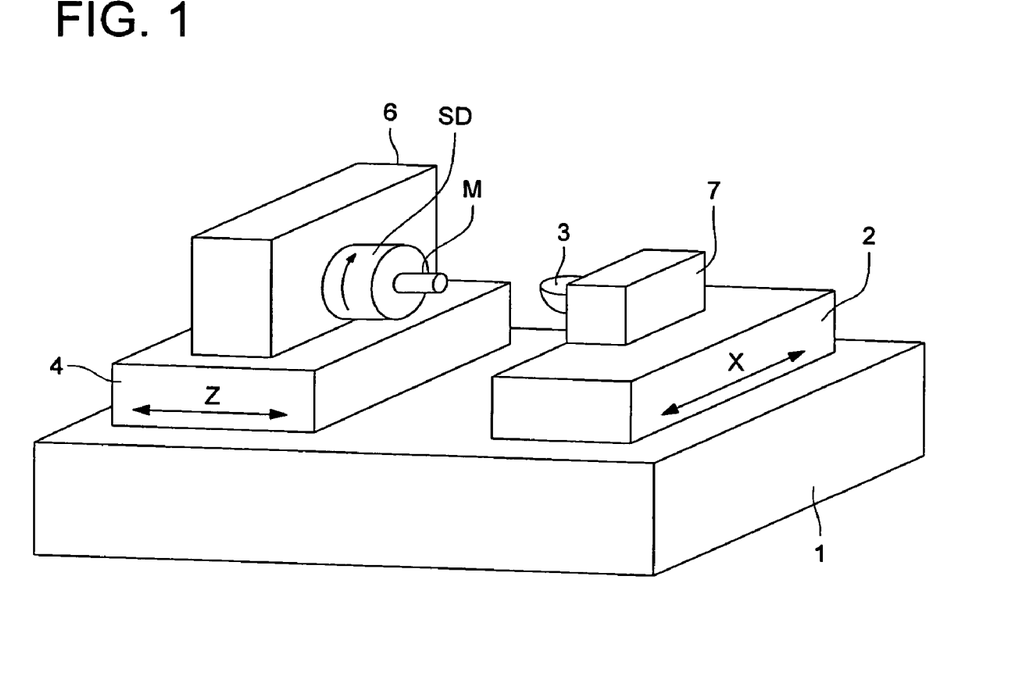
FIG. 1 is a perspective view of the biaxial high-precision lathe turning machine.

The following is a description of the preferred embodiments of this invention with reference to the drawings. The spindle device of the embodiments of this invention can use the biaxial high-precision lathe turning machine. In FIG. 1, the X-axis table 2 which is driven in the X-axis direction by a control device which is not shown is disposed on the surface plate 1. A diamond tool 3 is mounted on the X-axis table 2 via the tool mounting section 3. In addition, the Z-axis table 4 which is driven in the Z-axis direction by a control device-which is not shown is disposed on the surface plate 1. The Z-axis table 4 has a drive control mechanism 6 and a spindle device SD that is controlled by drive control mechanism 6. The work piece M which is a metal mold for an optical element for example, may be mounted on the main shaft of the spindle device SD. The biaxial high-precision lathe turning machine may be used for accurately cutting the transfer optical surface of the metal molding for the optical element.

Figure 2:
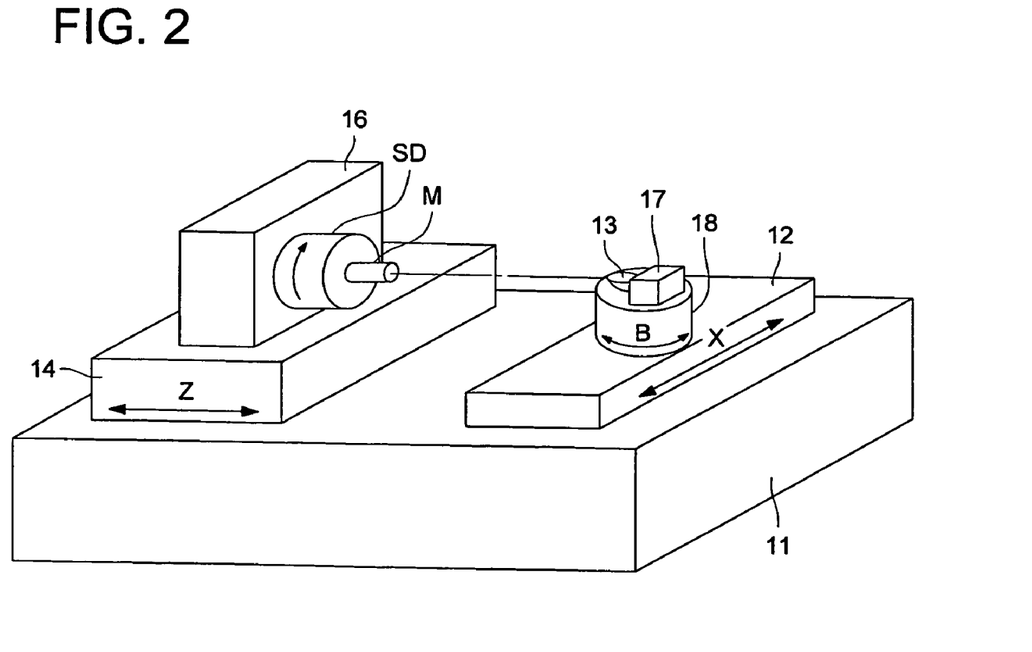
FIG. 2 is a perspective view of the high-precision lathe turning machine.

In addition, spindle device of the embodiment of this invention may be used in the high-precision lathe turning machine shown in FIG. 2. In FIG. 2, the X-axis table 12 which is driven in the X-axis direction and the Z-axis table 14 which is driven in the Z-axis direction are mounted on the surface plate 11. A revolving shaft (shaft B) 18 which can revolve the tool 13 is mounted on the X-axis table 12, and a tool mounting portion 17 is mounted on the revolving shaft 18. The Z-axis table 14 has a drive control mechanism 16 and a spindle device SD that is controlled by drive control mechanism 16. The work piece M which is metal mold for an optical element for example, may be mounted on the main shaft of the spindle device SD. The high-precision lathe turning machine may be used for accurately cutting the transfer optical surface of the metal mold for the optical element.

Figure 3:
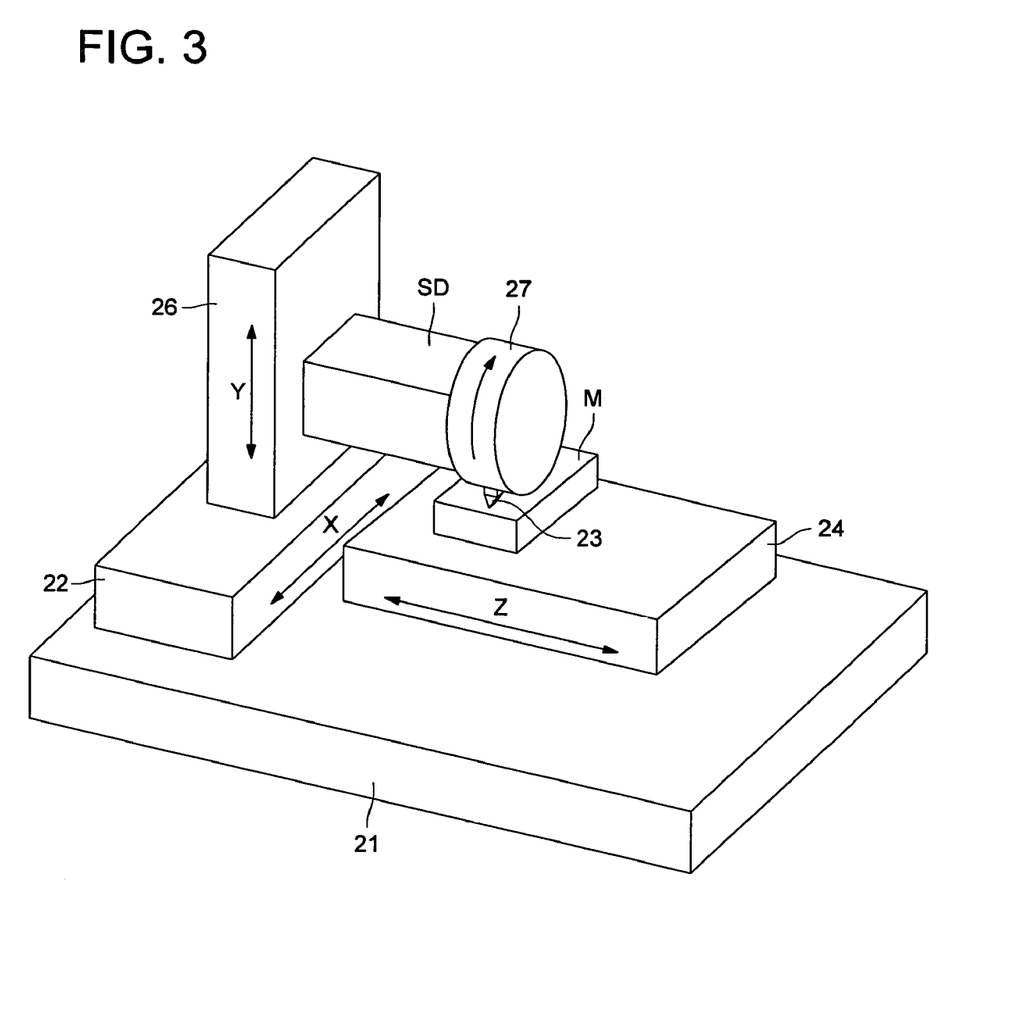
FIG. 3 is a perspective view of the ultra high-precision lathe turning machine having the orthogonal triaxial movable stage and the rotation mechanism to rotate diamond-tool.

Furthermore, the spindle device of the embodiment of this invention may be used in the ultra high-precision lathe turning machine shown in FIG. 3 which has a orthogonal triaxial movable stage and a rotation device which rotates the diamond tool. In FIG. 3, the X-axis table 22 which is driven in the X-axis direction and the Z-axis table 24 which is driven in the Z-axis direction are mounted on the surface plate 21. A Y-axis stage 26 which is driven in the Y-axis direction is mounted on the X-axis table 22 and a spindle mechanism SD is disposed on the Y-axis stage 26, and the main shaft thereof is connected to the rotation portion 27 for rotating the diamond tool 27. The rotating axis thereof is parallel to the Z axis. The work piece M is fixed on the Z-axis table 24.

Figure 4:
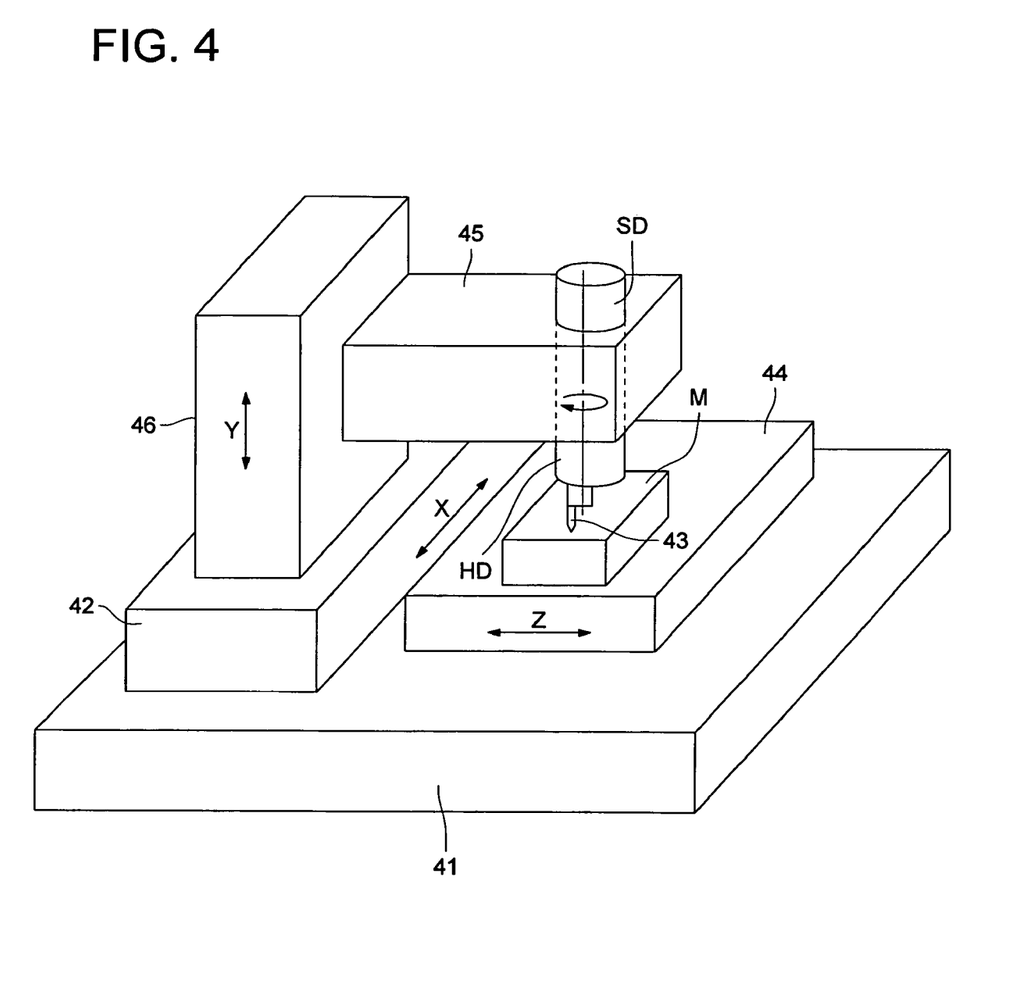
FIG. 4 is a perspective view of a milling machine.

Furthermore, the spindle device of the embodiment of this invention may be used in the milling machine shown in FIG.

4. In FIG. 4, the X-axis stage 42 which is driven in the X-axis direction and the Z-axis stage 44 which is driven in the Z-axis direction are mounted on the surface plate 41. The Y-axis stage 46 which is driven in the Y-axis direction is mounted on the X-axis table 42, and the spindle device SD which rotates the diamond tool 43 is supported by the arm 45 on the Y-axis stage 46. Mounting the tool on the end surface of the main shaft of spindle SD which is embedded in the arm 45 so that the blade tip of the tool locates, for instance, at the position 15 mm away from the rotation center in radial direction. With giving the cutting depth in Y-axis direction and feeding the diamond tool 43 in X-axis direction with respect to the work piece M fixed on A-axis stage 44, cutting work is done.

Figure 5:
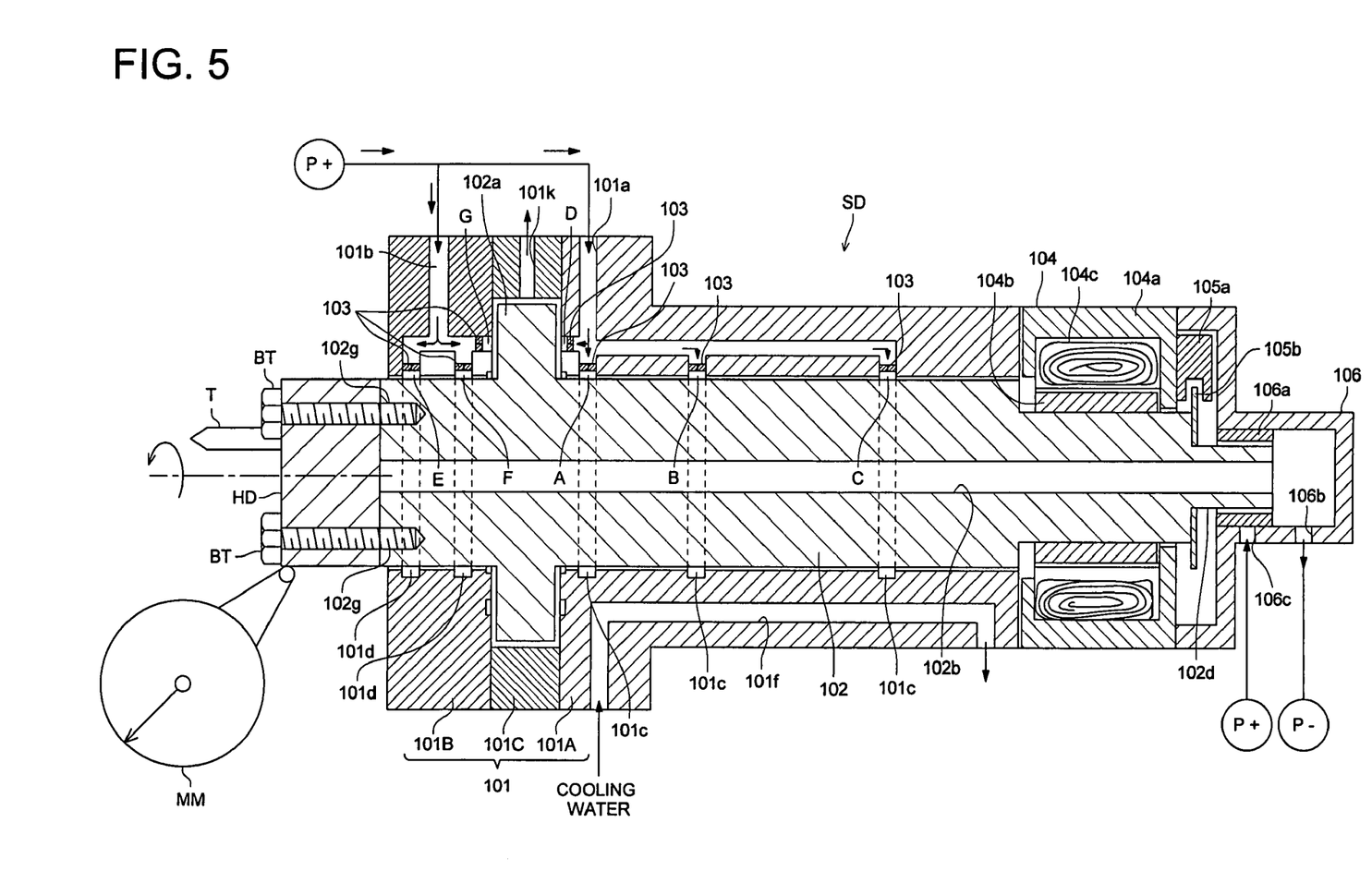
FIG. 5 is a cross-sectional view of an embodiment of the present invention.

FIG. 5 is cross-section view of the spindle device of this embodiment. The spindle device SD of FIG. 5 can be installed in the milling machine of FIG. 4 for example, however not limited thereto. Needless to say it may be installed in processing machines such as those in FIGS. 1 to 3 as well as in others.

In FIG. 5, a cylindrical main shaft 102 is inlaid inside the hollow cylindrical housing 101. The space between both is about 10 μm. The main shaft 102 has a flange 102a at the left end vicinity in FIG. 5 and also has a through-hole (also called suction path or fluid path) 102b. The housing 101 has a main housing 101A which is disposed at the right side of the flange 102a, a secondary housing 101B which is disposed at the left side of the flange 102a and a ring block 101C which connects the main housing 101A and the secondary housing 101B in the radial outer direction of the flange 102a.

The main housing 101A has a supply path 101a whose one end opens at the external peripheral surface and which is communicated with the positive pressure pump P+ which is an external source of fluid. The other end of the supply channel 101a opposes and opens onto the outer peripheral surface of the main shaft 102 in three rows which are aligned in the axial direction and are at 120 degree intervals in the peripheral direction (these are called the discharge ports A, B and C) and also opposes the flange 102a at the end surface of the main housing 101a and opens at a 120 degree interval in the peripheral direction (this is called the discharge port D). An aperture member 103 is inlaid between small openings (defined by the minimum cross sectional area of the supply path) at each of the discharge ports of the supply paths 101a. A peripheral groove 101c is formed at the inner peripheral surface at the main housing 101A so as to connect the discharge ports A, B and C of the supply paths 101a. It is to be noted that the housing 101A has a cooling jacket 101f in which cooling water flows, but these are not connected to the supply path 101a.

The secondary housing 101B has a supply path 101b whose one end opens at the external peripheral surface and which is connected to the positive pressure pump P+ which is an external source of fluid. The other end of the supply path 101b opposes and opens to the outer peripheral surface of the main shaft 102 in two rows which are aligned in the axial direction and are provided radially at 120 degree intervals in the peripheral direction (these are called the discharge ports E and F). It also opposes the flange 102a at the end surface of the secondary housing 101B and opens at a 120 degree interval in the peripheral direction (this is called the discharge port G). An aperture member 103 is fit between small openings at each of the discharge ports of the supply channels 101b A peripheral groove 101d is formed at the inner peripheral surface of the secondary housing 101B so as to communicate with the discharge ports E and F of the supply channel 101b.

The ring housing 101C has an air vent 101k which discharges air from the space between the inner periphery and the flange 102a of the main shaft 102 to the outer periphery.

The motor 104 which is the driving device is adjacent to the main housing 101A. The motor 104 is formed from the motor case 104a, the rotor 104b which is mounted on the main shaft 102, and the coil 104c which is disposed inside the motor case 104a which is at the outside in the radial direction of the rotor 104b, and the main shaft 102 is rotated and driven by supplying power to the coil 104c from the outside.

A reduced diameter cylindrical portion 102d is formed coaxially with the main shaft at the right end of the main shaft 102. The reduced diameter cylindrical portion 102d has an encoder plate 105b that rotates, integrally mounted at the outer periphery thereof. The encoder 105a detects the angle of rotation of the encoder plate 105b and determines the angle of rotation of the main shaft 102.

The end portion has the suction case 106 which is the connector member inserted at the front end of the reduced diameter cylindrical portion 102d. The suction case 106 is mounted using a bolt which is not shown to the housing 101 and the inner wall thereof has a static pressure pad SP formed as a perforated circular pipe which opposes the outer peripheral surface of the reduced diameter cylindrical portion 102d and a discharge port 106b is also formed there. The discharge port 106b is not on the extension of the through-hole 102b of the reduced diameter cylindrical portion 102d, but rather is disposed in the direction which crosses or is at right angles to it. A supply channel 106c which is provided at the suction case 106 at the back surface side of the hydrostatic pressure pad 106a is connected to the positive pressure pump P+ and pressurized air is supplied from the pump to the area between the outer peripheral surface of the reduced diameter cylindrical portion 102d and the inner peripheral surface of the hydrostatic pressure pad 106 via the pores in the hydrostatic pressure pad 106. When assembling and fixing the suction case 106, if the suction case. 106 is fixed to outer peripheral surface of the reduced diameter cylindrical portion 102d in the state where pressurized air is being sent from the supply channel 106c, automatic aligning with an accuracy of a few μm is performed by the static pressure and the suction case 106 is mounted to the housing 101 using bolts which are not shown. Thus, because the outer peripheral surface of the reduced diameter cylindrical portion 102d and the hydrostatic pressure pad 106a are aligned with an accuracy of a few μm or less and then fixed, contact with the reduced diameter cylindrical portion 102d is avoided. The space inside the suction case 106 communicates with the through-hole 102b of the main shaft 102 and the suction case 106 and the air in the through-hole 102b are suctioned by the negative pressure pump which is the negative pressure source connected to the discharge port 106b. The main shaft 102 having the through-hole 102b, the suction case 106, and the negative pressure pump P− form the adhering means. The static pressure pad 106a to which the compressed air by the positive pump P+ is pressure-fed forms the hydrostatic bearing.

The left end of the main shaft 102 is a flat surface and because the bolt-hole 102g is formed therein, it is used to mount the holder HD which holds the tool T. The bolt BT and the bolt-hole 102g form the fixing device. The holder HD has a flat mounting surface and a bolt through-hole. The method for mounting the holder HD which is the object will be described in the following.

Figure 6:
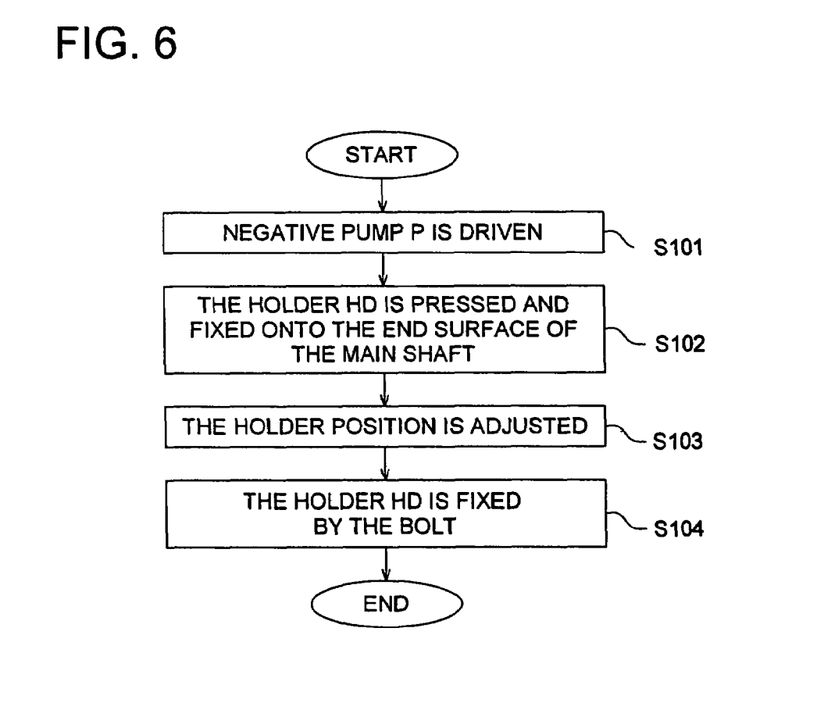
FIG. 6 is a flow chart explaining mounting method of the holder concerning an embodiment of the present invention.

FIG. 6 is a flowchart for describing the method for mounting the holder of this embodiment. First in Step S101, (first step) the negative pressure pump P− is driven, and in Step S102, the mounting surface for the holder HD is pressed onto the main shaft 102. When this is done, the air inside the through-hole 102b is suctioned via the suction case 106 causing negative pressure and thus the holder HD is fixed to the main shaft due to the pressure difference compared to atmospheric pressure. In this step, centering of the holder HD is performed while rotating the main shaft 102 and applying positive pressure to the hydrostatic bearing. More specifically, when the outer peripheral surface is used as the reference surface of the holder HD, a micrometer MM probe is placed there and the extent of deviation is measured. If the center is out of the permissible range, the position is adjusted (Step S103: second step). This is called centering (or fine adjustment) of the holder HD, but because the holder HD adheres to the end surface of the main shaft 102 due to negative pressure, if the outer peripheral surface of the holder HD is lightly tapped, the holder HD will shift and thus centering can be performed easily. After centering of the holder HD is appropriately carried out, in Step S104 (third step), the holder HD is fixed to the main shaft 102 by screwing a bolt BT into the bolt-hole 102g. At this time, the holder HD is adhered to the end surface of the main shaft 102 and thus when the bolt BT is tightened, no position shifting occurs. In addition, if the holder HD is fixed to the main shaft 102 using the bolt BT, even if the main shaft 102 is rotated and driven at the high speed of 10,000 $min^{-1}$ or more, dropping or shifting due to the centrifugal force does not occur.

When the spindle device SD of FIG. 5 is operated when integrated into the milling machine of FIG. 4, because the main shaft 102 is supported in a non-contact state with respect to the main housing 101A and the secondary housing 101B due to the air supplied from the positive pressure pump P+ to the inside of the main housing 101A and the secondary housing 101B via the discharge ports A, B, C, E and F of the supply path 101a and 101b, the load from the tool T in the radial direction can be received. In addition, because the flange 102a of the main shaft 102 is supported in a non-contact state with respect to the main housing 101A and the secondary housing 101B due to the air supplied from the positive pressure pump P+ to the inside of the main housing 101A and the secondary housing 101B via the discharge ports D and G of the supply path 101a and 101b, the load from the tool T in the thrust direction can be received. If the motor is driven in this state, the main shaft 102 rotates. The main shaft 102 which increases in temperature when driven to rotate, is cooled by cooling water that is supplied to the cooling jacket 101f and the thermal expansion thereof is controlled.

At this time, the discharge port of the supply path 101a at the main housing 101A is connected to the peripheral groove 101c, and the discharge port of the supply path 101b at the peripheral housing 101B is connected to the peripheral groove 101d, and thus even in the case where the cross-section of the main housing 101A, the secondary housing 101B or the main shaft 102 is not a perfect circle, the peripheral grooves 101c and 101d form a temporary collection region in which the air supplied from the supply channels 101a and 101b has a substantially uniform pressure along the entire circumference, and rapid changes in pressure can be controlled regardless of the positional relationship between the static pressure space due to rotation and the discharge port, and thus the changes in pressure applied to the outer peripheral surface of the main shaft 102 is controlled, and shaking and vibration thereof is also controlled.

It is to be noted that the air supplied from the supply channel 101a passes between the main shaft 102 and the main housing 101A and flows out from the space formed with the motor 104 to the outside. In addition, air supplied from the supply channel 101b passes between the main shaft 102 and the secondary housing 101B and flows out from the vicinity of the holder HD to the outside. Thus because there is no discharge path between the discharge ports A, B and C of the supply path 101a which open to the periphery and are aligned in the axial direction and the discharge ports E and F, the fluid that is supplied only passes between the outer peripheral surface of the main shaft 102 and the inner peripheral surface of the housings 101A and 101B and flows to the outside and the static pressure is thereby increased and the support rigidity is increased.

This invention has been described with reference to this embodiment, but this is not intended to limit this invention and needless to say, modification and improvements thereof are possible.

What is claimed is:

1. A method of mounting an object onto a main shaft of a spindle device, comprising:
   a first step of adhering the object onto the main shaft by holding the object onto the main shaft while allowing the object to move relative to the main shaft;
   a second step of positioning the object and the main shaft while maintaining the status of the first step, wherein the second step comprises adjusting the object relative to the main shaft; and
   a third step of fixing the object mechanically onto the main shaft by a screw while maintaining the status of the first step, so as to fix the position of the object relative to the main shaft,
   wherein adjusting the position of the object comprises centering the object relative to the main shaft while rotating the object and the main shaft.

2. The method of mounting the object of claim 1, wherein the first step of adhering the object onto the main shaft uses negative-pressure to suction the object onto the main shaft.

3. The method of mounting the object of claim 1, wherein the object comprises a tool, a work piece, or a holder configured to hold the tool or the work piece.

4. The method of mounting the object of claim 1, wherein fixing the object comprises inserting the screw into the main shaft while movably holding the object onto the main shaft.

5. The method of mounting the object of claim 1, wherein adhering the object onto the main shaft comprises holding the object onto the main shaft via a suction force, the suction force supplied through a suction path formed inside the main shaft.

6. The method of mounting the object of claim 1, wherein fixing the object comprises inserting the screw into the main shaft in a direction substantially parallel to a longitudinal axis of the main shaft.

7. A method of mounting an object onto a main shaft of a spindle device, comprising:
   holding the object onto the main shaft while allowing the object to move relative to the main shaft;
   positioning the object at a predetermined location relative to the main shaft while holding the object onto the main shaft, wherein positioning the object comprises adjusting the position of the object relative to the main shaft; and fixing the object onto the main shaft so as to fix the position of the object relative to the main shaft,
wherein adjusting the position of the object comprises centering the object relative to the main shaft while rotating the object and the main shaft.

8. The method of claim 7, wherein holding the object comprises suctioning a portion of the object via negative pressure.

9. The method of claim 8, wherein the negative pressure is supplied through a suction path formed inside the main shaft.

10. The method of claim 7, wherein the object comprises a tool, a work piece, or a holder configured to hold the tool or the work piece.

11. The method of claim 7, wherein fixing the object comprises inserting a screw into the main shaft while holding the object onto the main shaft.

12. The method of claim 7, wherein fixing the object comprises inserting a screw into the main shaft in a direction substantially parallel to a longitudinal axis of the main shaft.

* * * * *